(12) United States Patent
Mosterman

(10) Patent No.: US 9,542,164 B1
(45) Date of Patent: Jan. 10, 2017

(54) MANAGING AN APPLICATION VARIABLE USING VARIABLE ATTRIBUTES

(75) Inventor: Pieter J. Mosterman, Framingham, MA (US)

(73) Assignee: The MathWorks, Inc., Natick, MA (US)

(*) Notice: Subject to any disclaimer, the term of this patent is extended or adjusted under 35 U.S.C. 154(b) by 480 days.

(21) Appl. No.: 13/039,113

(22) Filed: Mar. 2, 2011

(51) Int. Cl.
  *G06F 9/44* (2006.01)
(52) U.S. Cl.
  CPC . *G06F 8/35* (2013.01); *G06F 8/34* (2013.01); *G06F 8/71* (2013.01)
(58) Field of Classification Search
  CPC ............... G06F 8/35; G06F 8/34; G06F 8/20; G06F 8/71
  USPC ................................................... 717/104, 105
  See application file for complete search history.

(56) References Cited

U.S. PATENT DOCUMENTS

| | | | | |
|---|---|---|---|---|
| 6,324,581 | B1* | 11/2001 | Xu et al. | 709/229 |
| 7,350,191 | B1* | 3/2008 | Kompella | G06F 8/61 707/999.005 |
| 8,050,870 | B2* | 11/2011 | Heckerman et al. | 702/19 |
| 2003/0101192 | A1* | 5/2003 | Yang | 707/101 |
| 2005/0246696 | A1* | 11/2005 | Alexander et al. | 717/151 |
| 2005/0251706 | A1* | 11/2005 | Alexander et al. | 714/49 |
| 2005/0251707 | A1* | 11/2005 | Alexander et al. | 714/49 |
| 2005/0257092 | A1* | 11/2005 | Alexander et al. | 714/37 |
| 2006/0020946 | A1* | 1/2006 | Alexander et al. | 719/315 |
| 2006/0053200 | A1* | 3/2006 | McCown | 709/206 |
| 2006/0064670 | A1* | 3/2006 | Linebarger et al. | 717/106 |
| 2007/0198792 | A1* | 8/2007 | Dice et al. | 711/163 |
| 2007/0198979 | A1* | 8/2007 | Dice | G06F 9/466 718/100 |
| 2008/0033897 | A1* | 2/2008 | Lloyd | 706/19 |
| 2008/0072209 | A1* | 3/2008 | Farrah et al. | 717/113 |
| 2008/0114842 | A1* | 5/2008 | Ellis et al. | 709/206 |
| 2008/0320058 | A1* | 12/2008 | Benhase et al. | 707/204 |
| 2009/0222513 | A1* | 9/2009 | Sallberg | G05B 19/0426 709/203 |
| 2009/0228865 | A1* | 9/2009 | De Becdelievre et al. | 717/106 |
| 2011/0252065 | A1* | 10/2011 | Ryu | G06F 17/3002 707/794 |

* cited by examiner

*Primary Examiner* — Viva Miller
(74) *Attorney, Agent, or Firm* — Harrity & Harrity, LLP

(57) ABSTRACT

A system is configured to receive a notification that variable information, associated with a variable, is stored in a logical workspace; obtain, in response to the notification, the logical workspace; and generate meta information associated with the variable, where the meta information includes information associated with a temporal attribute of the variable, information associated with an application that generated the variable information, information associated with a contextual attribute of the variable, or information associated with a spatial attribute of the variable. The system is also configured to associate, the meta information with the variable information, where associating the meta information with the variable information permits an operation to be performed on the meta information or on the variable information based on the meta information.

26 Claims, 8 Drawing Sheets

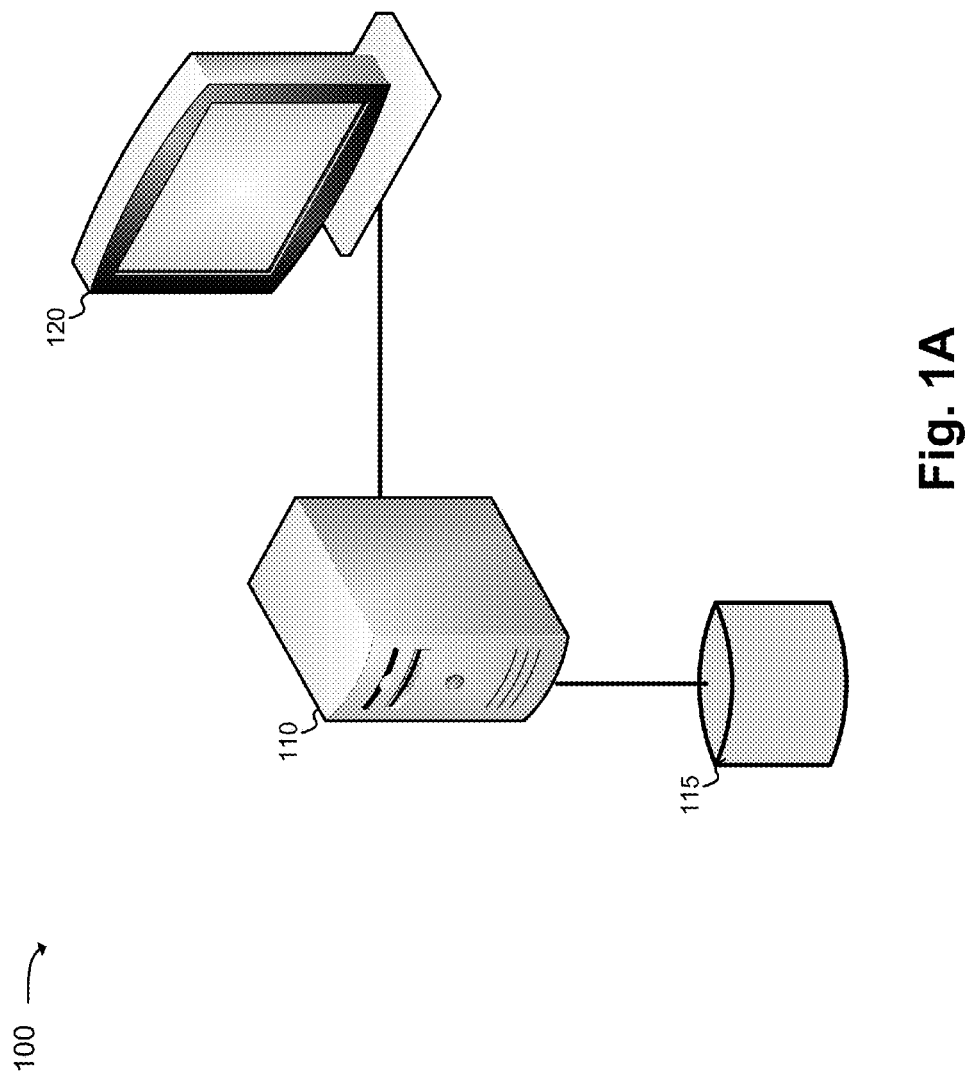

MANAGING AN APPLICATION VARIABLE USING VARIABLE ATTRIBUTES

BACKGROUND

Software applications may perform operations and/or tasks when executing logic and/or code associated with the applications. When performing the operations and/or tasks, the applications may generate information associated with variables that are used by the applications. The information associated with the variables, may include one or more values (e.g., numerical values, strings, alphanumeric values, etc.), names of the variables (e.g., velocity (v), position (x), time (t), etc.), and/or types of the variables (e.g., double precision, integer, floating point, etc.).

Unfortunately, managing information, associated with a variable, is often difficult when the information is generated one or more times by an application, by different applications, by different versions of the same application, by different versions of different applications, etc. Additionally, determining when the information, associated with the variable, was generated may not readily be determined from the information associated with the variable.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 1A is a diagram of an example environment in which systems and/or methods described herein may be implemented;

DETAILED DESCRIPTION

Figure 1B:
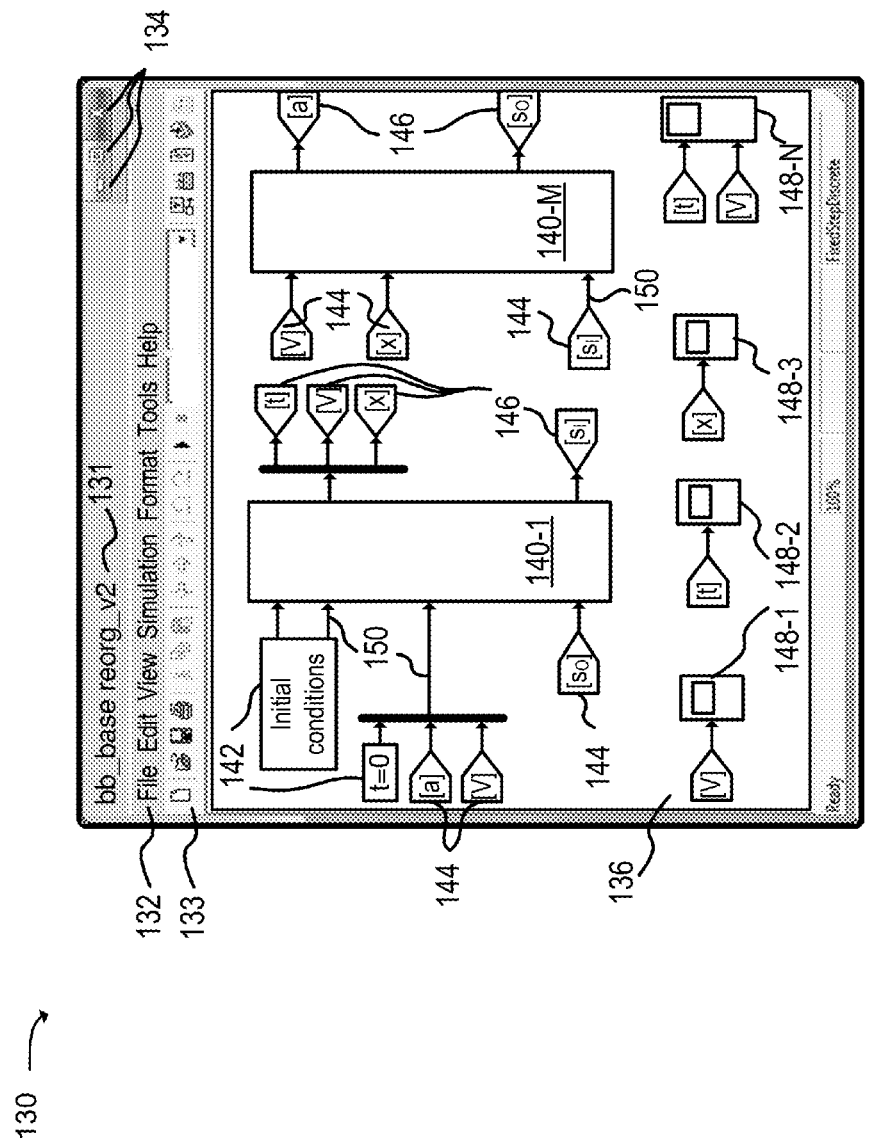
FIG. 1B is a diagram of an example application UI according to an implementation described herein.

The following detailed description refers to the accompanying drawings. The same reference numbers in different drawings may identify the same or similar elements. Also, the following detailed description does not limit the implementations, described herein.

Systems and/or methods, described herein, may enable information associated with a variable (hereinafter referred to as "variable information") to be managed and/or processed based on information associated with one or more attributes of the variable (hereinafter referred to as "meta information"). The meta information may, for example, include:

information associated with a temporal attribute of the variable, such as a version of variable, a time associated with the variable (e.g., a time stamp, etc.), an interval in time during which the information associated with the variable was generated by an application, etc.;

information associated with a historical attribute of the variable (e.g., one or more versions of the variable over a period of time, a change log of the variable over the period of time, etc.);

information associated with a spatial attribute of the variable (e.g., one or more application elements having read access to the variable, having write access to the variable, and/or are displayed, on a display device, with respect to the variable);

information associated with an application (e.g., an application name, a version of the application, a change log of the application, a logical element associated with the application, etc.) from which the information, associated with the variable, was generated;

information associated with a temporal attribute of an application (e.g., a version of the application, time that the application was created, time that the application was checked into a version control system, etc.);

information associated with a contextual attribute of the variable (e.g., a unique identifier that corresponds to the variable, etc.);

information associated with a logical workspace (e.g., a logical workspace name, a version of the logical workspace, etc.) into which the information, associated with the variable, is stored; and/or information associated with a visual attribute that is visible with respect to the application and/or the variable (e.g., an image, icon, and/or visual aesthetic associated with the application, etc.).

An application may be any type of computer program that, when executed, performs an act and/or operation, and/or generates variable information. For example, a computer program may implement a model of a dynamic system (e.g., a physical system, a software system, etc.) and may simulate the system when the program code is executed.

The application may be, for example, a technical application such as a model (e.g., an application that models and/or simulates a dynamic system, a physical phenomenon, a mathematical equation, etc.), a business application (e.g., an application that performs workflows, accounting, financial analysis, etc.), an operating system, etc.

In another example, the application may be a graphical model that can function within a technical computing environment (TCE). For example, the application may be an executable graphical model that performs an act and/or operation within the TCE when the model is executed. The executable graphical model may generate variable information that may be stored in a logical workspace and/or presented for display via a user interface associated with the logical workspace.

The TCE may include hardware and/or software based logic that provides a computing environment that allows operators to perform tasks related to disciplines, such as, but not limited to, mathematics, science, engineering, medicine, business, etc., more efficiently than if the tasks were performed in another type of computing environment, such as an environment that required the operator to develop code in a conventional programming language, such as C++, C, Fortran, Pascal, etc. The TCE may connect a model with code that is executing externally (e.g., on a target processor) to enable a processor-in-the-loop configuration, hardware-in-the-loop configuration, software-in-the-loop configuration, or model-in-the-loop configuration. The executable code may generate variable information that may be stored in a logical workspace and/or presented for display via a user interface associated with the logical workspace.

The TCE may automatically generate code from at least part of a model. The code may be software code (e.g., C+, C++, SystemC, etc.), hardware code (e.g., hardware description language (HDL), etc.), or some combination thereof.

In one example implementation, the TCE may include a dynamically typed language that can be used to express problems and/or solutions in mathematical notations familiar to those of skill in the relevant arts. For example, the TCE may use an array as a basic element, where the array may not require dimensioning and/or indexing. These arrays may be used to support array programming in that operations can apply to an entire set of values, such as values in an array. Array programming may allow array based operations to be treated as a high-level programming technique or model that lets a programmer think and operate on entire aggregations of data without having to resort to explicit loops of individual non-array, i.e., scalar operations.

A TCE may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

A TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, optimization, etc.). In another implementation, the TCE may provide these functions as block sets (e.g., an optimization block set). In still another implementation, the TCE may provide these functions in another way, such as via a library, etc. The TCE may be implemented as a text based environment, a graphically based environment, or another type of environment, such as a hybrid environment that is both text and graphically based.

A meta function may identify and/or generate meta information associated with a variable. Meta information may be identified and/or generated, by the meta function, each time the application processes and/or generates variable information. The meta function may be integrated with the application (e.g., as an application subroutine), with another application, or may be a stand-alone function. For example, a stand-alone meta function may be separate from the application and may be called by the application, and/or may call the application.

The meta function may generate, and/or cause the application to generate, meta information. The meta information may enable a device, on which the application is hosted, to manage the variable information. An operator may provide, to the device, an instruction that specifies how the device uses the meta information. The meta information may, for example, enable the operator to distinguish between variable information that was generated by an application and other variable information that was generated at another point in time, by another application, by another version of the application, etc. In another example, the meta information may enable an application to access a logical workspace to obtain particular variable information. The application may use the meta information to distinguish between the particular variable information and other variable information that is stored in the logical workspace.

The terms mask dialog, mask dialog entity, or simply mask may refer to a graphical user interface (UI) (e.g., a dialog box, a combo box, etc.) for a portion of a model (e.g., a subsystem) that may be created and/or customized to hide portions of the contents of the model/subsystem. For example, when a subsystem is masked, the subsystem may appear on a display with its own icon and/or a dialog box for showing and/or editing parameters that are related to the subsystem.

A masked subsystem may be associated with a logical workspace that is local to the subsystem. Parameters and variables may be part of the model, optionally stored in the local workspace. The subsystem may permit an operator to provide layers of graphical models within a graphical model to facilitate containment, separation, and/or nesting for a part of the graphical model. The operator may descend into the subsystem view from the top level to view the details of this subsystem model. The masked subsystem may provide encapsulation to control the operation and interaction of the logical elements contained in a block diagram associated with the masked subsystem. The masked subsystem may enable the operator to create a self-contained functional unit that has application-specific parameters. The application-specific parameters are mapped to generic parameters of the underlying elements in the masked subsystem. The parameters and variables may also be available in a logical workspace that may be global to the model, a number of models, or to the graphical modeling environment.

Example Environment

FIG. 1A is a diagram of an example environment 100 in which systems and/or methods described herein may be implemented. As illustrated in FIG. 1A, environment 100 may include a computing device 110 connected to a database 115 and a display device 120. In one example implementation, environment 100 may be a TCE that includes an application (e.g., hosted on computing device 110) that allows for models to be created, edited, and/or executed.

The number of devices, illustrated in FIG. 1A, is provided for explanatory purposes only. In practice, there may be additional devices, fewer devices, different devices, or differently arranged devices than illustrated in FIG. 1A. Additionally, or alternatively, a device, depicted in FIG. 1A, may perform a function described as being performed by another device of FIG. 1A. For example, computing device 110, database 115, and/or display device 120 could be integrated into a single device, such as a laptop computer, etc. that performs all or some of the functions described below as being performed by an individual one of these devices. Alternatively, computing device 110, database 115, and/or display device 120 may be implemented as multiple, possibly distributed, devices. For example, computing device 110 can be a server and display device 120 can be connected to a client device that makes use of applications and processing capabilities provided by the server. The devices of environment 100 may connect via wired connections, wireless connections, or a combination of wired and wireless connections.

Computing device 110 may include one or more devices (e.g., a personal computer, a laptop, a tablet computer, a server device, a wireless device, such as a mobile phone, a smart phone, or a personal digital assistant (PDA), or the like), or other types of computation or communication devices, that gather, process, search, store, and/or provide information in a manner similar to that described herein. In one example implementation, computing device 110 may include or be associated with a meta function, which computing device 110 may use to identify, process, and/or generate meta information associated with a variable.

Computing device 110 may perform a set up operation that enables an operator to specify a manner in which meta information is generated. For example, the meta function may cause computing device 110 to present a set up user interface (UI), for display on display device 120, via which set up information may be received from the operator. The set up information may identify the variable, for which the variable information is to be generated by an application. The set up information may also specify a manner in which the meta function generates the meta information. Computing device 110 may receive the set up information and may store the set up information in database 115.

Computing device 110 may execute the application to generate the variable information. The meta function may process and/or generate the variable information based on the set up information retrieved from database 115.

Database 115 may include one or more devices that store information and/or data. Database 115 may interface with computing device 110 and may store set up information associated with a variable. Database 115 may store information associated with a UI used by the application when generating and/or processing the variable information. Database 115 may also store information associated with a UI used by the meta function when generating and/or processing the meta information. Database 115 may further store the variable information and/or the meta information.

Display device 120 may include one or more devices that receive, process, and/or display information received from computing device 110. In one example, computing device 110 may render information on display device 120 via a UI associated with an application. In another example, computing device 110 may render, on display device 120, the variable information and/or the meta information, via a UI associated with a logical workspace. In yet another example, computing device 110 may render the variable information via a graphical UI.

Example User Interfaces

FIG. 1B is a diagram of an example application UI 130 that may be displayed on display 120. Application UI 130 may include an application name field 131, a menu bar field 132, a tool bar field 133, UI control buttons 134, and/or an application field 136. Application UI 130 is shown, in FIG. 1B, as including fields and/or buttons 131-136 for explanatory purposes. In practice, application UI 130 may include additional fields and/or buttons, fewer fields and/or buttons, different fields and/or buttons, and/or differently arranged fields and/or buttons than are described with respect to application UI 130 of FIG. 1B.

Application name field 131 may identify a name associated with an application on which application UI 130 is based. In one implementation, the name may include a sequence of characters that uniquely identifies the application. Menu bar field 132 may include a file menu, an edit menu, a view menu, a simulation menu, a format menu, a tools menu, a help menu, and/or other menus that, when selected by an operator of computing device 110, permit the operator to perform various functions in relation to the application. Tool bar field 133 may include tools that permit the operator to open an application, store an application, execute an application, pause an application, compile an application, share an application, navigate an application, edit an application, and/or perform operations on an application (e.g., linearization, parameter estimation, operating point computations, etc.). For example, an operator may use tool bar 133 to cause the application to execute. Causing the application to execute may enable the application to generate variable information and/or associate the variable information with a logical workspace. UI control buttons 134 may permit the operator to, for example, close application UI 130, and control the size and/or shape of application UI 130.

Application field 136 may provide a computing environment that may allow, for example, an application to perform tasks related to disciplines, such as, but not limited to, mathematics, science, engineering, medicine, business, biology, and finance. Application field 136 may include a dynamically-typed programming language (e.g., the MATLAB® language) that can be used to express problems and/or solutions in mathematical notations.

Application field 136 may be configured in a manner that enables the application to perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, and state-based analysis and/or design.

Application field 136 may further provide mathematical functions and/or graphical tools that may be used for creating plots, surfaces, images, volumetric representations, or other representations. Application field 136 may provide these functions and/or tools using toolboxes (e.g., toolboxes for signal processing, image processing, data plotting, and/or parallel processing). In addition, application field 136 may provide these functions as block sets. Application field 136 may also provide these functions in other ways, such as via a library, local or remote database, and so on.

Application field 136 may be, for example, a time-based graphical block diagram model, a state transition diagram, a discrete event model, an activity diagram, a unified modeling language (UML) diagram, a sequence diagram, a data flow model, or some other type of model or diagram. Application field 136 may be configured to represent a system, such as a physical system. Application field 136 may be graphical, textual, or some combination of graphical and textual. The system represented by application field 136 may be dynamic, linear, non-linear, or some other type of system.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing systems, and a stock market.

Application field 136 may include logical elements, associated with the application, that enable the operator to set up, edit, and/or create the application. Application field 136 may act as a modeling canvas. The logical elements represented via application field 136 may have various execution semantics that may be represented as a collection of modeling elements, often referred to as blocks. A block may generally refer to a portion of functionality that may be used in the application. The block may be graphically represented. However, it can be appreciated that the block does not necessarily need to be represented graphically. For example, the block may be represented textually or stored in some form of internal representation. Also, a particular visual depiction used to represent the block, for example in a graphical block diagram, may be an arbitrary design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model.

For example, a masked subsystem can provide a hierarchical scoping mechanism such that the subsystem that is masked defines the top of a hierarchy. Variables within the scoping area can be global such that each function within the scoping area can access the same variables if the variables are accessible at the scoped level. One of ordinary skill in the art will appreciate that the present implementation is not only applicable to variables, but also other application elements such as parameters, and the present implementation may also apply to dependencies across multiple applications and not just dependencies within a single application.

The parameters and variables may be part of the application, optionally stored in local workspaces, such as, for example, that of a masked subsystem. A subsystem allows an operator to provide layers of graphical models within a graphical model to facilitate containment, separation and/or nesting for a part of the graphical model. An operator may descend into the subsystem view from the top level to view the details of this subsystem model.

A masked subsystem provides encapsulation to control the operation and interaction of the blocks (e.g., logical elements and/or logical blocks) contained in application field 136. A masked subsystem allows an operator to create a self-contained functional unit that may have application-specific parameters. The application-specific parameters may be mapped to generic parameters of the underlying elements in the masked subsystem. The parameters and variables may also be available in a workspace that can be global to the model, a number of models, or to the graphical modeling environment.

Application field 136 may include one or more of logical block elements 140-1, . . . , 140-M (where M≥1), initial condition elements 142, read variable elements 144, write variable elements 146, and logical source elements 148-1, . . . 148-N (where N≥1) (hereinafter collectively referred to as source elements 148, and, in some instances, individually as source element 148), that are logically connected by one or more logical connectors 150. Application UI 130 will be described below with respect to an application that models and/or simulates a dynamic system, such as the behavior of a bouncing ball. Systems and methods, described herein, are not limited to applications that model and/or simulate dynamic systems, but are, instead, applicable to any type of environment where managing application variables is desired.

Logical block element 140 may correspond to logic, associated with the application, that performs an act and/or operation (e.g., associated with the bouncing ball). Each logical block element 140 may perform different act and/or operation. Initial condition element 142 may correspond to information associated with initial values that correspond to the act and/or operation. For example, initial condition element 142 may (e.g., in the case of the bouncing ball) correspond to an initial velocity (e.g., v=1 meter/second), an initial height and/or position of the ball (e.g., h=0.6 meters), and/or an initial time (e.g., t=0 seconds).

Write variable element 144 may correspond to information associated with an input variable, via which logical block element 140 receives information and/or data (e.g., via logical connector 150). Write variable element 144 may enable logical block element 140 to execute the act and/or operation (e.g., associated with the bouncing ball) based on the information associated with the input variable. The information associated with the input variable may be a single value or an array of values that, in the case of the bouncing ball, correspond to one or more velocities (e.g., shown as "[v]"), one or more accelerations (e.g., shown as "[a]"), one or more discrete states (e.g., shown as "[$s_O$]") to be used to execute the act and/or operation.

Generated variable element 146 may correspond to variable information that is generated and/or processed by logical block element 140 as a result of executing the act and/or operation (e.g., associated with the bouncing ball). The variable information may be a single value, an array of values, a multi-dimensional array of values, a structured data type of values, an array of values of a structured data type, etc. The array may be homogeneous such that all elements are of the same or a similar data type or the array may be heterogeneous in a manner that includes elements of varying data types. In the case of the bouncing ball, the variable information may be an array of values that correspond to one or more computed velocities (e.g., shown as "[v]"), computed accelerations (e.g., shown as "[a]"), computed positions (e.g., shown as "[x]"), times (e.g., shown as "[t]"), ball/floor contact indicators (e.g., shown as "[$s_I$]"), etc. associated with the executed acts and/or operations.

Source element 148 may enable variable information to be associated with a logical workspace and/or a UI associated with the logical workspace. Each source element 148 may correspond to respective variable information (e.g., [v], [t], [x], etc.), and/or variable information associated with multiple variables (e.g., [t] and [v], etc.). Source element 148 may, in one example, be a write block to store variable information and/or meta information in a memory and/or logical workspace. Source element 148 may be, in another example, a data store memory block to store variable information during execution of the application. Source element 148 may be, in yet another example, an outport block that establishes a link between the application and a destination via which variable information and/or meta information may flow. The destination may be specified as a local workspace, a global workspace, a UI associated with a workspace, another application, etc. Source element 148 may be, in yet another example, a log block that enables log information associated with an executing model to be stored in the logical workspace or presented for display via the UI associated with the logical workspace. Source element 148 may be, in yet another example, a scope block that enables information associated with an executing model to be stored in the logical workspace or presented for display via a UI associated with the scope block. Source element 148 may cause a meta function, hosted by computing device 110, to generate meta information associated with a variable. Source element 148 may further associate the meta information with variable information that is stored in the logical workspace and/or some other logical workspace.

Figure 1C:
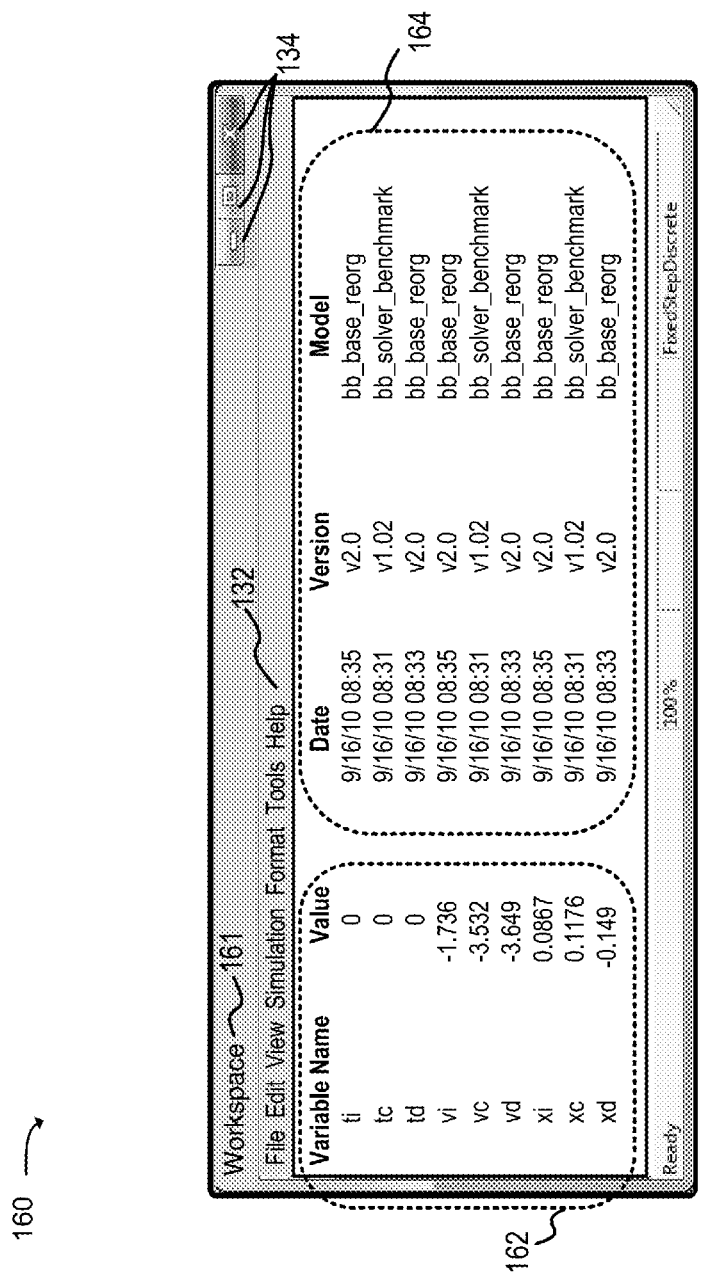
FIG. 1C is a diagram of a logical workspace UI according to an implementation described herein.

FIG. 1C is a diagram of a logical workspace UI 160 (hereinafter referred to as "workspace UI 160") according to an implementation described herein. As set forth above, computing device 110 may present, for display on display device 120, a logical workspace UI (e.g., workspace UI 160) that corresponds to a logical workspace. The logical workspace may be a local workspace that stores variable information and/or meta information associated with an application and/or particular logical elements (e.g., blocks) associated with the application. In another example implementation, the logical workspace may be a global workspace that stores variable information and/or meta information associated with the application and/or other applications.

In yet another example implementation, the logical workspace, with which workspace UI 160 is associated, may be based on a distributed workspace. The distributed workspace may include a collection of logical workspaces. Each of the workspaces may store all or a portion of the variable information and/or the meta information.

Workspace UI 160 may include a workspace name field 161, a group of variable fields 162, and a group of meta fields 164. Workspace UI name field 161 may include an identifier associated with workspace UI 160. Variable fields 162 may include variable information, generated by the application, that correspond to one or more source elements 148 (e.g., identified in application UI 130). The variable information may include a respective name that corresponds to each of the variables (e.g., ti, tc, td, vi, vc, etc.), a respective value that corresponds to each of the variables (e.g., 0, 0, 0, −1.736, etc., respectively), and/or a respective size of the variable (e.g., precision scalar, an array, a struct, a data type such as double or a fixed point type, etc.) associated with each of the variables (not shown in FIG. 1C).

Meta fields 164 may include meta information associated with the variables identified in variable fields 162. The meta information may include, for example, a date and/or time (e.g., month/day/year; hours:minutes; and/or some other format) at which the variable information was generated by the application (e.g., 9/16/10 08:35, 9/16/10 08:31, etc.) (e.g., as annotated by the dashed outline 164). Meta information may also include information associated with a version of the variables (e.g., v2.0, v1.02, etc.) and/or information associated with the application from which the variable information was generated (e.g., bb_base_reorg, bb_solver_benchmark, etc.) (e.g., annotated by the dashed outline 164).

Workspace UI 160 is shown, in FIG. 1C, as including fields 161-164 for explanatory purposes. In practice, workspace UI 160 may include additional fields, fewer fields, different fields, and/or differently arranged fields than are described with respect to workspace UI 160 of FIG. 1C.

Example Device Components

Figure 2:
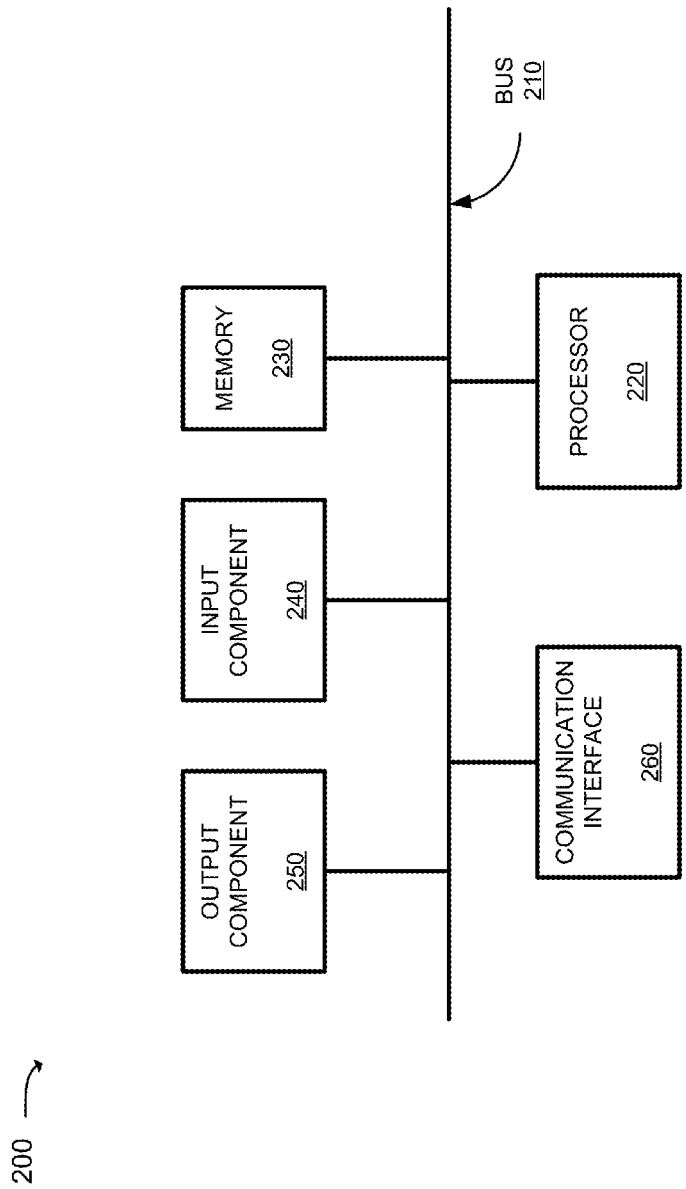
FIG. 2 is a diagram illustrating example components of a device of FIG. 1.

FIG. 2 is a diagram illustrating example components of a device 200. Device 200 may correspond to computing device 110 of FIG. 1A. Alternatively, computing device 110 may include multiple devices 200. As shown in FIG. 2, device 200 may include a bus 210, a processor 220, a memory 230, an input component 240, an output component 250, and a communication interface 260.

Although FIG. 2 shows example components of device 200, in other implementations, device 200 may include fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that interprets and executes instructions. Memory 230 may include any type of dynamic storage device that stores information and instructions, for execution by processor 220, and/or any type of non-volatile storage device that stores information for use by processor 220.

Input component 240 may include a mechanism that permits an operator to input information to device 200, such as a keyboard, a keypad, a multipoint input device, a gyroscope, an accelerometer, a button, a switch, a microphone, a camera, a fingerprint reader, a global positioning system (GPS), etc. Output component 250 may include a mechanism that outputs information to the operator, such as a display, a speaker, one or more light emitting diodes (LEDs), a haptics-based device, etc.

Communication interface 260 may include any transceiver-like mechanism that enables device 200 to communicate with other devices and/or networks via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network.

Device 200 may perform certain operations described below. Device 200 may perform these operations in response to processor 220 executing software instructions contained in a computer-readable medium, such as memory 230. A computer-readable medium may be defined as a non-transitory memory device. A memory device may include a space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Example Set Up User Interface

Figure 3:
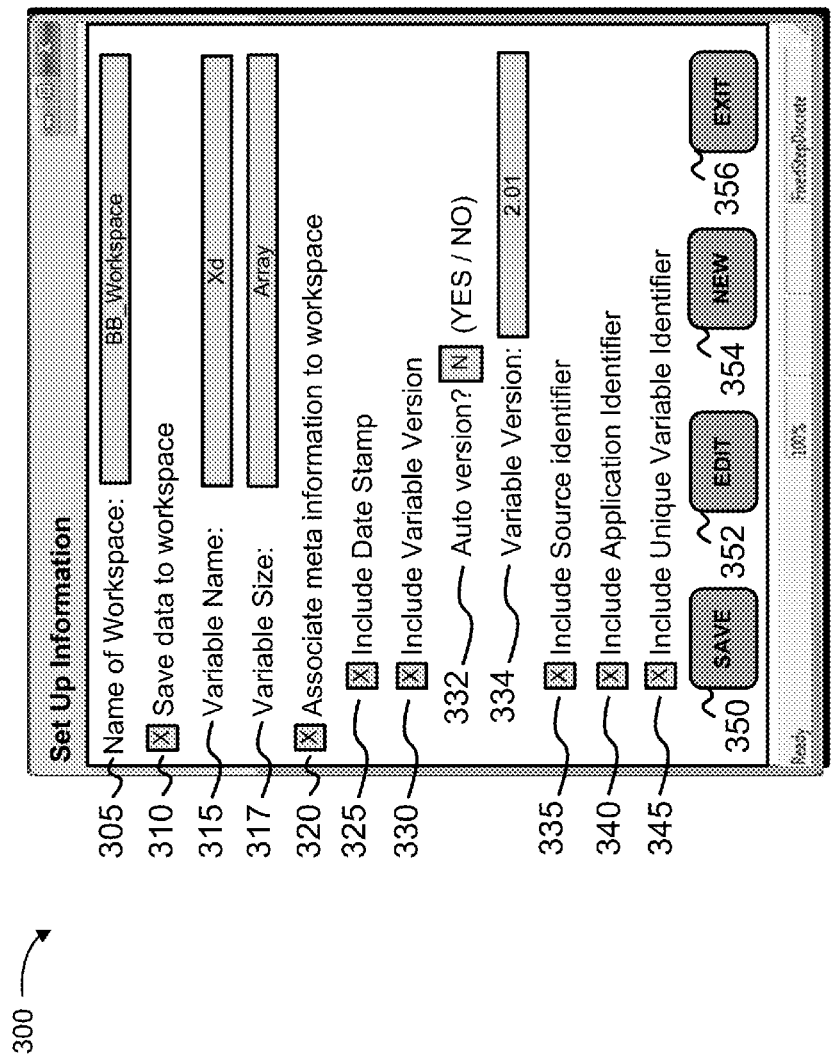
FIG. 3 is a diagram illustrating an example variable set up user interface according to an implementation described herein.

FIG. 3 is a diagram illustrating an example variable set up UI 300 (hereinafter referred to as "set up UI 300") according to an implementation described herein. Set up UI 300 may include a collection of fields and/or buttons, such as a workspace name field 305, a save data indication field 310, a variable name field 315, a variable size field 317, an associate meta information indication field 320 (hereinafter referred to as "associated meta information field 320"), a date stamp indication field 325, a variable version field 330, an automatic version (auto version) indication field 332, a variable version field 334, a source identifier field 335, an application identifier field 340, a unique variable identifier field 345, a save button 350, an edit button 352, a new button 354, and an exit button 356. Set up UI 300, of FIG. 3, includes fields and/or buttons 305-356 for explanatory purposes. In practice, set up UI 300 may include additional fields and/or buttons, fewer fields and/or buttons, different fields and/or buttons, and/or differently arranged fields and/or buttons than are described with respect to set up UI 300.

Workspace name field 305 may store information that identifies a logical workspace. For example, an operator, associated with computing device 110, may enter information identifying a local workspace (e.g., a model workspace, a block workspace, a block mask workspace, etc.) that corresponds to an application that generates variable information. In another example, the operator may enter information associated with a global workspace that corresponds to one or more other applications.

Save data indication field 310 may store an indication specifying whether to store the variable information in the logical workspace. For example, variable information may be stored in the logical workspace (e.g., a data structure associated with the logical workspace) when an operator enters, into save data indication field 310, an indication that the variable information is to be stored.

Variable name field 315 may store information that identifies a variable for which the variable information is generated. For example, the operator may enter information that identifies the variable (e.g., a variable name, a character, a string of characters, etc.) for which the variable information is to be generated by the application. Variable size field 317 may store information associated with a size that corresponds to the variable information. For example, the operator may enter information identifying the size of the variable as an array, a structure, etc.

Associate meta information field 320 may store an indication regarding whether meta information is to be stored in the logical workspace and/or associated with the variable information that is stored in the logical workspace. For example, the meta function may cause the meta information to be stored in the logical workspace when an operator enters an indication into associate meta information field 320. In another example, the meta function may cause the meta information to be associated with the variable information, that is stored in the logical workspace, when the operator enters an indication into associate meta information field 320.

Date stamp indication field 325 may permit the operator to specify whether a date and/or time associated with the variable is to be included within the meta information. For example, the application may generate the variable information at a particular point in time and the meta function may include information associated with the particular point in time in the meta information.

Variable version field 330 may permit the operator to specify whether version information, associated with the variable, is to be included within the meta information. For example, information associated with the version of the variable (e.g., a version identifier, a version identifier included as part of a variable name, etc.) may be included within the meta information when the operator enters an indication into variable version field 330.

Auto version indication field 332 may permit the operator to specify whether the information associated with the version of the variable is to be automatically generated when the operator specifies (e.g., by selecting variable version field 330) that information for the version of the variable is to be included in the meta information. Variable version field 334 may permit the operator to associate a version with the variable.

Source identifier field 335 may permit an operator to specify that information associated with source element 148 (FIG. 1B), to which the variable corresponds, is to be included in the meta information. Application identifier field 340 may permit the operator to specify whether information associated with the application is to be included in the meta information. For example, the meta function may include information, associated with the application (e.g., an application identifier, an application name, etc.), in the meta information when the operator enters an indication into application identifier field 340.

Variable identifier field 345 may permit the operator to specify whether a unique identifier for the variable is to be generated and/or included in the meta information. For example, the meta function may generate a unique identifier (e.g., a globally unique identifier (GUID)) for the variable. The meta function may include the unique identifier with the meta information when the operator enters an indication into unique variable field 345.

Save button 350 may permit the operator to save (e.g., to database 115) set up information, associated with the variable, that is received via set up UI 300. Edit button 352 may permit the operator to edit the set up information that has been previously saved. New button 354 may permit the operator to specify other set information associated with another variable. Exit button 356 may permit an operator to close set up UI 300.

Example Process for Setting Up Meta Information

Figure 4:
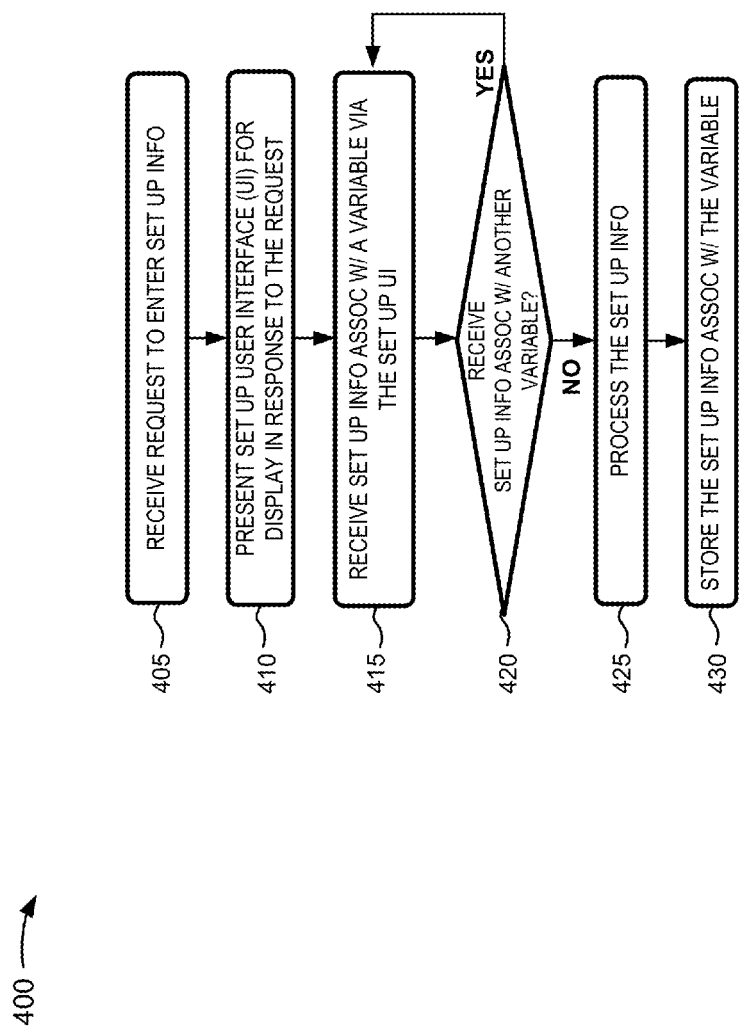
FIG. 4 is a flow chart of an example process for setting up information associated with one or more attributes of a variable.

FIG. 4 is a flow chart of an example process 400 for setting up meta information associated with a variable. In one example implementation, process 400 may be performed by computing device 110. In another example implementation, some or all of process 400 may be performed by another device or a group of devices separate from or including computing device 110.

As shown in FIG. 4, process 400 may include receiving a request to enter set up information (block 405) and presenting a set up UI for display in response to the request (block 410). For example, computing device 110 may receive a request, from an operator of computing device 110, to set up a logical workspace into which variable information, associated with a variable, is stored. A meta function, hosted by computing device 110, may retrieve information associated with a set up UI (e.g., set up UI 300 of FIG. 3) from a memory associated with computing device 110 (e.g., database 115). The meta function may, in response to the request, render the set up UI on display device 120 based on the retrieved information associated with the set up UI.

As also shown in FIG. 4, process 400 may include receiving set up information associated with a variable via the set up UI (block 415). For example, computing device 110 may receive, via the set up UI, set up information that corresponds to a variable that is associated with the application. The operator may, for example, enter information associated with the logical workspace via the set up UI and the meta function may receive the information associated with the logical workspace (e.g., shown as BB_workspace in workspace name field 305 of FIG. 3). The logical workspace may be associated with the application and/or with one or more other applications.

The operator may indicate that the variable information is to be stored, by the application, in the logical workspace (e.g., by entering an "X," into a box associated with save data indication field 310 of FIG. 3). For example, the meta function may receive the indication, via the set up UI, and may cause the variable information to be stored in the logical workspace. The operator may enter an identifier associated with the variable via the set up UI and the meta function may receive the identifier (e.g., shown as Xd in variable name field 315 of FIG. 3). The operator may enter information associated with a size of the variable and the meta function may receive the information associated with the size (e.g., shown as array in variable size field 317 of FIG. 3).

The meta function may receive an indication that the meta information is to be stored in the logical workspace. In another example, the meta function may receive an indication that the meta information is to be associated with the variable information that is stored in the logical workspace (e.g., when the operator selects a box corresponding to associate meta information field 320 of FIG. 3). The operator may request that a date and/or time when the application generates the variable information be included in the meta information (e.g., by entering an "X," into a box associated with data stamp field 325 of FIG. 3). The meta function may receive the request and may identify a time when the application generates the variable information. The meta function may include information associated with the time in the meta information.

The operator may request that a version associated with the variable is to be included in the meta information (e.g., by entering an "X," into a box associated with data stamp field 330 of FIG. 3). The meta function may receive the request, via the set up UI, and may automatically generate an updated version, associated with the variable. For example, the meta function may automatically generate the updated version when the operator indicates that the updated version is to be automatically generated (e.g., by entering an "X," into a box associated with auto version field 332 of FIG. 3). In another example, the operator may not desire that the version be automatically generated and may not send the request that the version is to be automatically generated (e.g., by not entering the indication into auto version field 332). The meta function may receive information associated with the version to be included with the meta information when the operator enters, into the set up UI, the information associated with the version (e.g., shown as 2.01 in variable version field 334 of FIG. 3).

The operator may request that information associated with source element 148 (FIG. 1B), that corresponds to the variable, is to be included in the meta information (e.g., by entering an "X," into a box associated with source identifier field 335 of FIG. 3). The meta function may receive the request, via the set up UI, and may include in the set up information, the indication that the information associated with source element 148 is to be included in the meta information (e.g., an application element identifier, an application element hyperlink, etc.). The operator may request that information associated with source element 148 be included in the meta information (e.g., by entering an "X," into a box associated with source identifier field 340 of FIG. 3).

The meta function may receive the request, via the set up UI, and may include in the set up information, the indication that the information associated with the application (e.g., an application name, an application identifier, part of an application versioning log, an identification of who made the most recent changes to the application, an identification of an application location such as a device name, a longitude or latitude, or internet protocol address, etc.) is to be included in the meta information.

The operator may request that a unique identifier, associated with the variable, be included in the meta information (e.g., by entering an "X," into a box associated with unique variable identifier field 345 of FIG. 3). The meta function may receive the request, via the set up UI, and may include, in the set up information, the indication that the unique identifier is to be included in the meta information.

The operator may enter an instruction to cause the set up information to be stored, in a memory associated with computing device 110 (e.g., database 115), by selecting a button (e.g., save button 350 of FIG. 3) within the set up UI.

As further shown in FIG. 4, if set up information associated with another variable is received (block 420—YES), then process 400 may return to receiving set up information associated with the other variable via the set up UI (block 415). For example, the operator may desire to enter set up information associated with one or more other variables and may select another button on set up UI (e.g., new button 354 of FIG. 3). The meta function may receive selection of the other button and may enable the operator to enter the set up information, associated with the one or more other variables, via the set up UI, in a manner similar to that described above (e.g., with respect to block 420). In another example, each of the one or more variables may be associated with a respective meta function. In this example, the respective meta function may receive the set up information associated with the one or more variables and may store the set up information in the memory.

As yet further shown in FIG. 4, if set up information associated with another variable is not received (block 420—NO), then process 400 may include processing the set up information (block 425).

The meta function may process the set up information received via the set up UI. For example, the meta function may use the set up information associated with each of the one or more variables to create a logical workspace associated with the variables for which set up information was received. The meta function may, for example, create a logical workspace based on the workspace name (e.g., BB_Workspace) specified in the set up information (e.g., as shown in workspace name field 305 of FIG. 3) or based on the application name (e.g., bb_base_reorg v2 as shown in application name field 131 of FIG. 1).

In one example implementation, the meta function may create the logical workspace when the set up information is received and/or before a point in time when the application begins to generate variable information. In another example, the meta function may create the logical workspace during a period of time that the application is generating the variable information. In yet another example, the meta function may create the logical workspace after another point in time when the application has completed generating the variable information. In another example implementation, the logical workspace may have been created at a prior point in time. The logical workspace may, for example, have been created by the TCE, by the application, by the meta function, and/or by another meta function.

As still further shown in FIG. 4, process 400 may include storing the set up information (block 430). For example, the meta function may store the set up information, associated with the variable, in a data structure associated with the logical workspace. The data structure may be located in a memory associated with computing device 110 (e.g., in memory 230, in database 115, and/or in another location).

Example Logical Workspace UI

Figure 5:
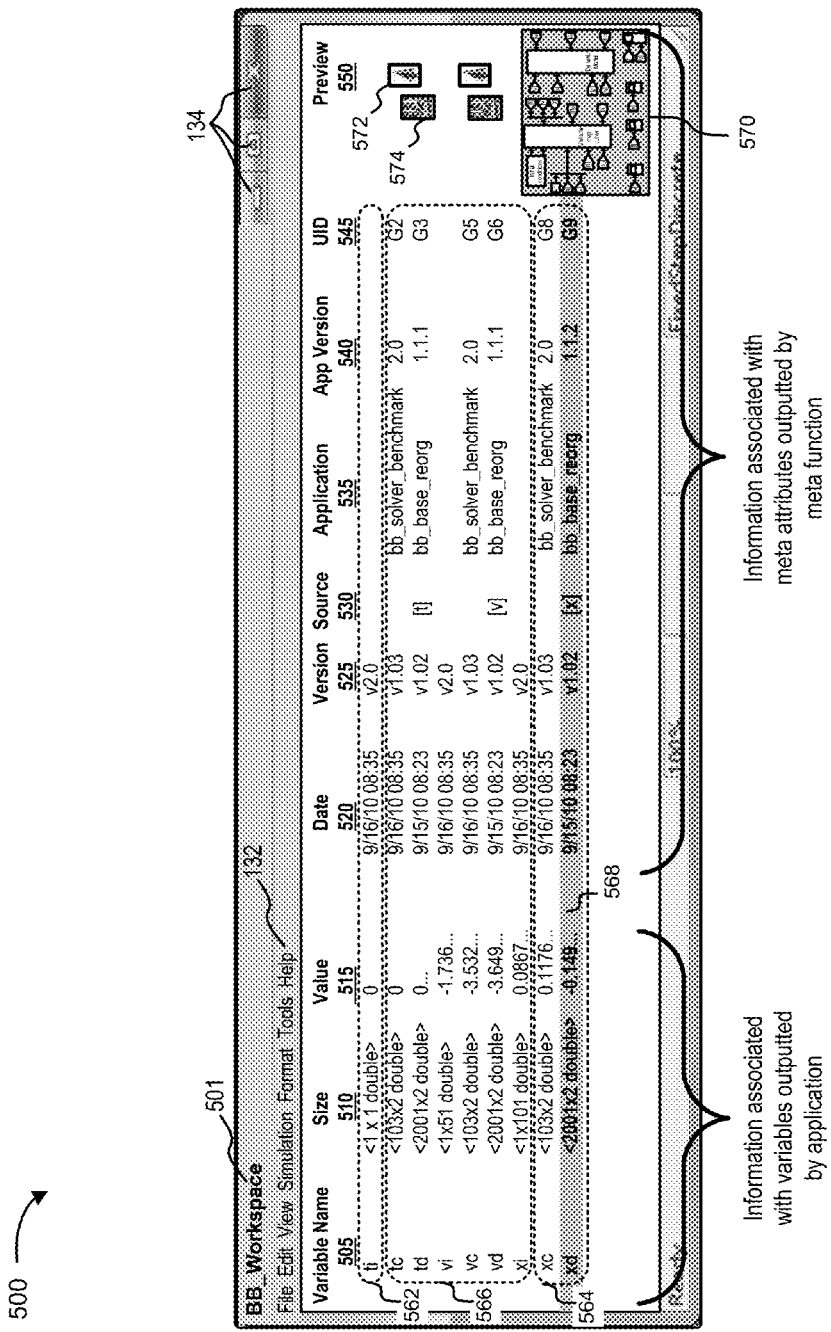
FIG. 5 is a diagram illustrating an example logical workspace user interface according to an implementation described herein.

FIG. 5 is a diagram illustrating an example logical workspace UI 500 (hereinafter referred to as "workspace UI 500") according to an implementation described herein. Workspace UI 500 may include menu field 132 and UI control buttons 134 that enable an operator to perform acts in a manner similar to that described above (e.g., with respect to FIG. 1B). Additionally, workspace UI 500 may include a collection of fields, such as a workspace name field 501, a variable name field 505, a size field 510, a value field 515, a date field 520, a version field 525, a source field 530, an application field 535, an application (app) version field 540, a unique identifier (UID) field 545, and a preview field 550. Workspace UI 500, of FIG. 5, includes fields 501-550 for explanatory purposes. In practice, workspace UI 500 may include additional fields, fewer fields, different fields, and/or differently arranged fields than are described with respect to workspace UI 500.

The discussion below describes variable information and/or meta information being presented for display via a logical workspace UI (e.g., workspace UI 500). In other implementations, all or a portion of the variable information and/or the meta information may be stored in a data structure associated with the logical workspace in addition to or instead of being presented for display via the logical workspace UI.

In another example implementation, the logical workspace with which workspace UI 500 is associated may be based on a distributed workspace. The distributed workspace may include a collection of logical workspaces. Each of the workspaces may store all or a portion of the variable information and/or the meta information. Each of the workspaces may be stored in a memory associated with a particular device (e.g., computing device 110 and/or data base 115) and/or one or more memories associated with different devices. Thus, the meta function may obtain (e.g., based on service oriented architecture concepts) the variable information and/or the meta information from each of the workspaces and may render the variable information and/or the meta information in workspace UI 500 as if workspace UI 500 was a local workspace associated with the application. The meta function may perform a synchronization operation when meta information and/or variable information, stored in a particular workspace, has been changed (e.g., deleted, stored, updated, etc.). The meta function may cause the changed meta information and/or variable information to be stored in all or a portion of other workspaces that are part of the distributed workspace.

Workspace name field 501 may include an identifier associated with workspace UI 500. For example, the meta function may obtain the identifier, associated with workspace UI 500, from the set up information associated with a variable and may present the identifier for display via workspace name field 501.

Fields 505-515 may correspond to variable information that is generated and/or rendered for display via workspace UI 500 by the application. In another example implementation, the application and/or the operator may instruct the meta function to render the variable information for display via workspace UI 500. Variable name field 505 may include an identifier, associated with the variable for which set up information has been obtained. For example, the application may generate variable information and the meta function may present the identifier, associated with the variable, for display via variable name field 505. Size field 510 may include information associated with a size of the variable. For example, the application may identify a size of a variable (e.g., scalar, array, structure, etc.) from the set up information and/or from the variable information. The application may present the information associated with the size of a variable, for display via size field 510.

Value field 515 may include data, associated with the variable, that was generated by the application. For example, the application may execute the logic associated with a logic block included in the application (e.g., logic block 140 of FIG. 1B) to generate the data associated with the variable. The data associated with the variable may correspond to a value (e.g., a number, a character or string, an alphanumeric value, etc.) and/or an array of values. When the data is an array of values, the value field may include a visual indication that distinguishes the array of values from other data that is not an array of values. The application may present the data, associated with the variable, for display via value field 515.

Fields 520-550 may correspond to meta information based on set up information associated with the variable. Date field 520 may include a temporal attribute of the variable that includes a date and/or time at which the variable information was generated by the application. For example, the meta function may determine that the set up information, associated with the variable, indicates that a data and/or time stamp is to be included in the meta information. Based on this determination, the meta function may present information associated with the date and/or time stamp for display via date field 520.

Version field 525 may include another temporal attribute of the particular variable that includes a version of the particular variable. For example, the meta function may determine that the set up information indicates that a version of the particular variable is to be included in the meta information. Based on this determination, the meta function may present the version of the variable for display via version field 525. In one example, the meta function may automatically generate the version of the variable (e.g., based on an indication, within the set up information, that the version is to be automatically generated). In another example, the meta function may obtain the version from the set up information.

Source field 530 may include an application attribute for the variable that corresponds to source element 148 (FIG. 1B). For example, the attribute of the variable may include information associated with source element 148 via which the variable information and/or meta information is associated with logical workspace. For example, the meta function may determine that the set up information indicates that information, associated with source element 148, is to be included in the meta information. Based on this determination, the meta function may present information, associated with source element 148, for display via source field 530.

Application field 535 may store another application attribute. As shown, application field 535 may store information identifying the application that generated the variable information associated with the variable identified in variable name field 505. The meta function may store the other application attribute, in application field 535, based on a determination that the set up information indicates that the other application attribute is to be included in the meta information.

App version field 540 may include a further application attribute that includes information associated with a version of the application identified in application field 535. For example, the meta function may determine that the set up information indicates that the version, of the application, is to be included in the meta information. Based on this determination, the meta function may present the information, associated with the version of the application, for display via app version field 540.

UID field 545 may include information associated with a contextual attribute of the particular variable that includes a unique identifier. For example, the meta function may determine that the set up information indicates that a unique identifier (e.g., a globally unique identifier, or GUID, and/or some other unique identifier), associated with the particular variable, is to be included in the meta information. Based on this determination, the meta function may generate the unique identifier. For example, the unique identifier may be generated, by the meta function, using a hash function, cryptographic function, and/or some other mathematical function.

The unique identifier may be based on one or more of: information associated with the logical workspace (e.g., a workspace name, identifier, etc.), a variable name (e.g., xd), a version of the variable (e.g., 2.01), information associated with the application (e.g., an application name, application identifier, an application version, etc.), an identifier that corresponds to a source element (e.g., source element 148) associated with the variable, information associated with a date and/or time that the application generates and/or processes variable information, information associated with the operator profile (e.g., name, usergroup, etc.), information associated with the location of the applications (e.g., geo location, network location, etc.), and/or other information.

Preview field 550 may include information associated with a visual attribute of the variable. The information may include, for example, information associated with an icon and/or a visual image associated with the application (e.g., as identified in application field 136 of FIG. 1B). The visual image may include one or more objects that correspond to logical elements and/or blocks that are identified in application field 136. For example, the meta function may determine that the set up information includes an indication that information associated with the application is to be included within workspace UI 500. Based on this determination, the meta function may retrieve, from a memory associated with computing device 110, information associated with an icon that corresponds to the application for display via preview field 550. In another example, the meta function may retrieve, from the memory, information associated with an image that corresponds to the application for display via preview field 550 (e.g., the appearance of a layer in the hierarchy of a graphical model).

The meta function may receive an indication that variable information is to be stored in a logical workspace and/or presented for display via a logical workspace UI. The indication may be received in a number of ways. For example, the indication may be received when the application begins to generate variable information. In another example, the indication may be received before the variable information is generated and/or when a logical workspace is created. In yet another example, the indication may be received after the variable information and/or logical workspace has been generated. The meta function may receive the indication and may retrieve, from the memory, the set up information associated with the variable. The set up information may include an indication of the logical workspace with which the meta information and/or variable information is to be associated.

The application may present, for display on display device 120, all or a portion of the variable information via a logical workspace UI (e.g., workspace UI 500). The variable information may include a variable name (e.g., ti), information associated with a size of a variable, such as an array (e.g., <1×101 double>), one or more values associated with the particular variable (e.g., 0) (e.g., as shown by dashed outline annotation 562).

The meta function may associate the meta information with the logical workspace, with the variable information stored in the logical workspace, and/or with the variable information displayed via the logical workspace UI. The meta function may, in one example, present the meta information for display via the logical workspace UI in a manner that corresponds to the displayed variable information. For example, the meta function may, based on the set up information, determine that a date and/or time stamp (e.g., 9/16/10 08:35) and/or information associated with a version of the particular variable (e.g., v2.0) is to be associated with the logical workspace (e.g., as shown by dashed outline annotation 562).

The logical workspace UI (e.g., workspace UI 500) may include variable information associated with other variables (e.g., as shown by the dashed outline annotation 564 and/or 566). The other variable information may have been generated by the application, another version of the application, and/or another application. The meta function may also associate meta information associated with the other variables based on set up information associated with the other variables (e.g., as shown by the dashed outline annotation 564 and/or 566).

Fields 505-550 may be static or dynamic, where information associated with each field may be accessed, by an operator, via workspace UI 500. For example, the operator may select, via the logical workspace UI, variable information and/or meta information that are included within the fields associated with the logical workspace (e.g., using a pointing device, a keyboard, and/or some other device). A static field may include information that is statically displayed via the logical workspace UI. A dynamic field may enable the operator to dynamically change the appearance of the information shown in the logical workspace UI or to obtain additional information regarding an item shown in the logical workspace UI.

For example, the operator may select particular variable information (e.g., xd), which may cause the particular variable information and/or meta information to change in appearance (e.g., to become highlighted, to change to a bold font, to change color, etc., as shown by highlight data item 568). In another example, the meta function may render, for display via the logical workspace UI and/or via another UI, other meta information and/or variable information that is not being displayed via the logical workspace UI or the other UI. In yet another example, the operator may select a value associated with the variable (e.g., −0.149 . . . ) and the meta function may render an array of values (e.g., −0.149, −0.145, −0.140, etc.) that corresponds to the size of the variable (e.g., 2001×2 double) included in size field 510. The meta function may render the array of values in another UI and/or within workspace UI 500.

In another example implementation, the selection may cause an application image (e.g., application image 570), associated with the other application to be displayed within the logical workspace (e.g., via workspace UI 500) and/or via another UI. Additionally, or alternatively, the meta function may cause an application icon (e.g., application icon 572) to be displayed within the logical workspace that corresponds to an application identified in the logical workspace.

For example, application icon 572 may correspond to the application (e.g., bb_solver_benchmark) and application icon 574 may correspond to the other application (e.g., bb_base_reorg). Application icon 572 and/or 574 may include visually aesthetic information (e.g., a color, trademark, trade name, symbol, logo, file type indicator, etc.) that correspond to the application and/or other application, respectively. The operator may cause an application image, that corresponds to an application with which the application icon is associated, to be displayed via the logical workspace UI and/or another UI, when the operator selects (e.g., by a single click of a pointing device) and/or places a cursor proximate to the application icon. Additionally, or alternatively, the operator may cause an application UI (e.g., application UI 130 of FIG. 1) to be displayed when the operator selects (e.g., by a double click of the pointing device) the application icon (e.g., application icon 574).

Example Process for Managing Variable Information Using Meta Information

Figure 6:
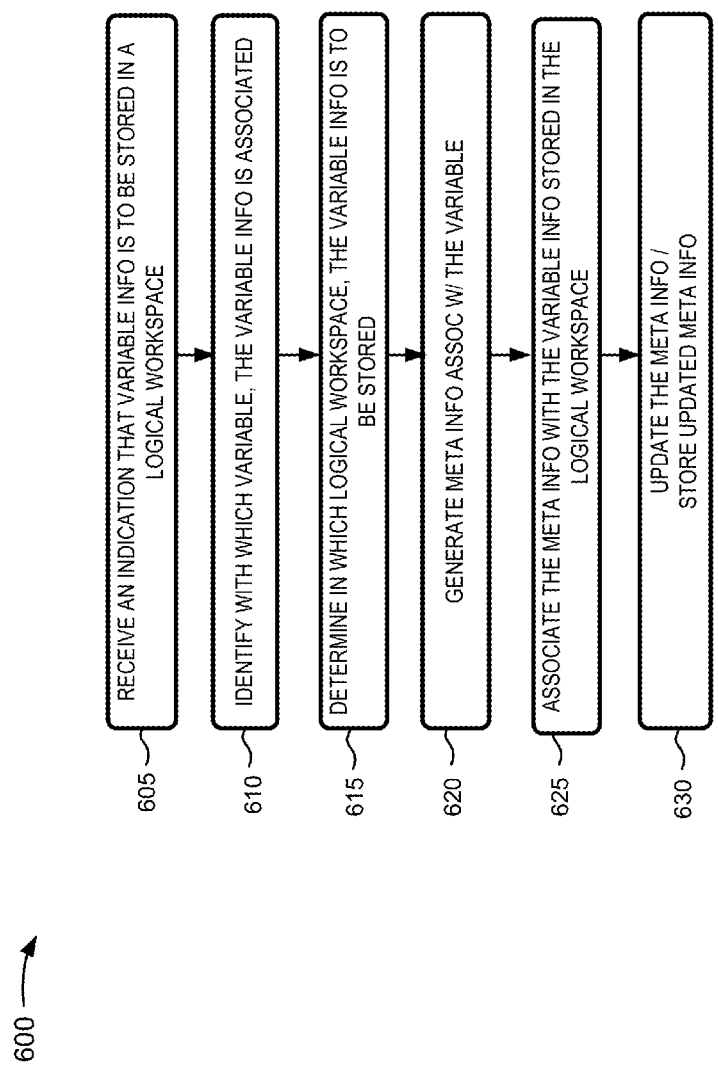
FIG. 6 is a flow chart of an example process for managing information associated with a variable using information associated with one or more attributes of the variable according to an implementation described herein.

FIG. 6 is a flow chart of an example process 600 for managing variable information using meta information according to an implementation described herein. In one example implementation, process 600 may be performed by computing device 110. In another example implementation, some or all of process 600 may be performed by another device or a group of devices separate from or including computing device 110.

As shown in FIG. 6, process 600 may include receiving an indication that variable information is to be stored in a logical workspace (block 605). For example, an operator may enter an instruction to an application that causes variable information to be stored in a logical workspace and/or displayed via a UI associated with the logical workspace. In one example, the meta function may receive an indication, from the application, that the variable information was, or is to be, stored in the logical workspace and/or displayed via the logical workspace UI. In another example, the meta function may receive the instruction from the operator.

As also shown in FIG. 6, process 600 may include identifying with which variable, the variable information is associated (block 610) and determining in which logical workspace the variable information is to be stored (block 615). For example, the meta function may identify the variable for which the variable information is to be stored and/or displayed based on the indication received from the application and/or the instruction received from the operator.

In one example implementation, set up information, associated with the variable may be retrieved. For example, the meta function may retrieve, from a memory associated with computing device 110 (e.g., database 115 of FIG. 1A), set up information associated with the variable based on the identification of the variable. The meta function may identify, from the set up information, in which of one or more logical workspaces the variable information is to be stored and/or displayed (e.g., via a respective logical workspace UI associated with the one or more logical workspaces).

In another example implementation, the meta function may not retrieve the set up information associated with the variable. For example, the meta function may identify the variable in a manner similar to that described above and, based on the identification of the variable, may automatically (e.g., without retrieving the set up information) identify the logical workspace in which the variable information is to be stored and/or the logical workspace UI on which the variable information is to be displayed. The automatic identification of the logical workspace may be pre-determined (e.g., pre-programmed by the operator) and/or embedded within the meta function. In another example, the identification of the logical workspace may be obtained from the indication received from the application and/or the instruction received from the operator in a manner that does not include retrieving the set up information.

The logical workspace may, in one example, have been created at a prior point in time. In another example, the logical workspace may be created, by the meta function, based on the identification of the logical workspace. With respect to the other example, the meta function may present, for display on display device 120, information associated with the logical workspace UI (e.g., workspace UI 500 of FIG. 5) via which the variable information may be displayed by the application. Additionally, or alternatively, the meta function may create a data structure, associated with the logical workspace, in which the variable information may be stored by the application.

As further shown in FIG. 6, process 600 may include generating meta information associated with the variable (block 620). For example, the meta function may generate meta information associated with the variable based on the set up information associated with the variable. In one example, the meta function may determine whether a temporal attribute, associated with the variable, is to be included in the meta information.

For example, if the set up information indicates that a time and/or date stamp is to be included in the meta information, then the meta function may identify a time at which the variable information was generated and/or stored (e.g., in the logical workspace) by the application. The meta function may include the time, as a date and/or time stamp, in the meta information. If the set up information does not indicate that the temporal attribute is to be included in the meta information, then the meta function may not identify the time and/or may not include the date and/or time stamp in the meta information.

In another example, the meta function may determine whether another temporal attribute, associated with the variable, is to be included in the meta information. For example, if the set up information indicates that a version of the variable is to be included in the meta information, then the meta function may identify the version of the variable and/or may include the version of the variable in the meta information. In one example, the version may have been specified, at a prior point in time, in the set up information by the operator (e.g., in a manner similar to that described above with respect to FIG. 4).

In another example, the meta function may identify a version based on a value, associated with the variable, stored in a data structure and/or based on a version enumerator, such as a counter, associated with the variable. If the set up information does not indicate that the other temporal attribute is to be included in the meta information, then the meta function may not identify the version and/or may not include the version in the meta information.

The meta function may determine whether information associated with the application (e.g., an application identifier, a name, etc.), a version associated with the application, and/or a source element (e.g., source element 148 of FIG. 1) associated with the application is to be included in the meta information. For example, if the set up information indicates that the information associated with the application is to be included in the meta information, then the meta function may include the information associated with the application in the meta information. In another example, if the set up information indicates that the version, and/or the source element is to be included in the meta information, then the meta function may include the version and/or the source element in the meta information. If the set up information does not indicate that the information associated with the application, the version, and/or the source element is to be included in the meta information, then the meta function may not include the information associated with the application, the version, and/or the source element in the meta information.

The meta function may determine whether a contextual attribute, associated with the variable, is to be included in the meta information. For example, if the set up information indicates that a unique identifier is to be included in the meta information, then the meta function may include the unique identifier in the meta information.

The unique identifier may be generated based on all or a portion of the variable information and/or the meta information. For example, the unique identifier may be based the variable information, such as an identifier associated with the variable, one or more values associated with the variable, etc. Additionally, or alternatively, the unique identifier may be based on the meta information, such as information associated with the workspace (e.g., a name, an identifier, etc.), temporal attributes of the variable (e.g., a date and/or time stamp, a version of the variable, etc.), information associated with an application (e.g., an application name, information associated with a source element associated with the variable, a version of the application, etc.), and/or other meta information.

The meta function may use a hash function, cryptographic function, and/or some other mathematical function to generate the unique identifier based on the meta information and/or the variable information. If the set up information does not indicate that the contextual attribute is to be included in the meta information, then the meta function may not generate the unique identifier and/or may not include the unique identifier in the meta information.

The meta function may determine whether a visual attribute, associated with the variable, is to be included in the meta information. For example, if the set up information indicates that an icon and/or image, associated with the application from which the information associated with the variable was generated is to be included, then the meta function may include information associated with the icon and/or image in the meta information. The information, associated with the icon and/or the image may be retrieved from a memory associated with computing device 110. If the set up information does not indicate that the visual attribute is to be included in the meta information, then the meta function may not include the information associated with the icon and/or the image in the meta information.

In another example implementation, the meta function may automatically generate the meta information in a manner that does not include retrieving and/or using the set up information associated with the variable. Automatically generating the meta information may be based on pre-determined (e.g., pre-programmed by the operator) and/or embedded instructions within the meta function. The instructions may include an indication that one or more of the temporal, application, contextual, and/or visual attributes, as described above, are to be included in the meta information.

In yet another example implementation, the meta function may generate the meta information based on default set up information. For example, the set up information, associated with the variable, may include an indication that default settings are to be used to generate the meta information. Based on the indication that the default settings are to be used, the meta function may generate the information associated with the variable to include one or more of the temporal, application contextual, and/or visual attributes, as described above, based on the default settings.

As still further shown in FIG. 6, process 600 may include associating the meta information with the variable information stored in the logical workspace (block 625). For example, the meta function may associate the meta information with the variable information that is stored in the logical workspace in a number of ways. For example, the meta function may store the meta information in the logical workspace (e.g., within a data structure associated with the logical workspace) in a manner that corresponds to the variable information. In another example, the meta function may present, for display on display device 120, the meta information via a logical workspace UI (e.g., workspace UI 500). The meta function may present the meta information in a manner that corresponds to the variable information that is displayed via the logical workspace UI.

In another example implementation, the meta function may associate the meta information with the variable information in a manner that enables another application to access the variable information based on the meta information. For example, the meta function may associate the meta information with the variable information to be generated for and/or operated on by another application.

In another example, the meta function may associate the meta information with the variable information that is associated with another logical workspace. The other logical workspace may be associated with one or more other applications, which may enable the one or more other applications to perform an operation on the information associated with the variable based on the meta information.

As also shown in FIG. 6, process 600 may include updating the meta information and storing the updated meta information (block 630). For example, the meta function may increment a version, associated with the variable, that was generated by the meta function. In another example, the meta function may increment a counter, associated with the version of the variable. The meta function may store, in a data structure associated with the logical workspace, the incremented version associated with the variable.

CONCLUSION

The systems and/or methods, described herein, may enable variable information, associated with a variable, to be managed using meta information associated with the variable. The meta information may enable the variable information to be distinguished from other variable information that was generated by the application at another point in time, by another version of the application, by another application, and/or by another version of another application. The systems and/or methods may associate the meta information with the variable information that is stored in a logical workspace.

The foregoing description provides illustration and description, but is not intended to be exhaustive or to limit the description to the precise form disclosed. Modifications and variations are possible in light of the above teachings or may be acquired from practice of the implementations.

While series of blocks have been described with regard to FIGS. 4 and 6, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the embodiments. Thus, the operation and behavior of the embodiments were described without reference to the specific software code—it being understood that software and control hardware may be designed to implement the embodiments based on the description herein.

Further, certain portions, described above, may be implemented as a component or logic that performs one or more functions. A component or logic, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the embodiments. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving a notification that variable information, associated with a variable, is stored in a data structure associated with a logical workspace,
        the variable information being generated by a first application associated with the logical workspace in which the variable is stored,
        an identifier of the variable being included in the first application, and
        the identifier of the variable being included in a second application;
    accessing, based on the notification, the data structure associated with the logical workspace;
    retrieving, from a memory, set up information associated with the variable,
        the set up information identifying a manner in which meta information, associated with the variable, is generated;
    generating the meta information associated with the variable,
        the meta information being generated in the manner identified by the set up information,
        the meta information including information associated with a temporal attribute of the variable and further including at least one of:
            information identifying a time at which the variable information was generated by the first application,
            information associated with a version of the variable,
            information associated with the first application,
            information associated with a contextual attribute of the variable,
            information associated with a visual attribute of the variable,
            information associated with the logical workspace,
            information associated with a spatial attribute of the variable,
            information associated with a temporal attribute of the first application,
            information associated with a change log of the variable over a period of time; and
    associating the meta information with the variable information that is stored in the data structure associated with the logical workspace,
        the meta information being associated with the variable information to permit an operation to be performed on:
            the meta information, or
            the variable information, and
    the receiving, the accessing, the retrieving, the generating, and the associating being performed by one or more computing devices.

2. The method of claim 1, where associating the meta information with the variable information includes:
    storing all or a portion of the meta information in the data structure associated with the logical workspace.

3. The method of claim 1, where associating the meta information with the variable information includes:
    presenting, to a display device associated with the one or more computing devices, the meta information for display via a user interface associated with the logical workspace.

4. The method of claim 1, where associating the meta information with the variable information includes:
    sending the meta information to another application associated with the logical workspace,
        where sending the meta information to the other application enables the other application to perform another operation on the variable information or the meta information.

5. The method of claim 1,
    where the information, associated with the first application, includes at least one of:
        an identifier associated with the first application,
        an application name, or
        a version associated with the first application.

6. The method of claim 1,
    where the identifier of the variable is a unique identifier that distinguishes the variable information from other variable information associated with another variable.

7. The method of claim 1,
    where the information, associated with the visual attribute of the variable, includes:
        information associated with an icon or image that corresponds to the first application,
            where the information associated with the icon or image includes at least one of:
                a visual appearance of the icon,
                a trademark associated with the first application,
                information associated with a brand of the first application, or
                a logical representation of a model displayed via a user interface,
                    the model being associated with the variable.

8. The method of claim 1, further comprising:
    determining that the set up information indicates that the meta information is to include:
        the information associated with the temporal attribute of the variable, and
        at least one of:
            the information associated with the first application that generated the variable information,
            the information associated with the contextual attribute of the variable, or
            the information associated with the visual attribute of the variable.

9. A computing device, in a technical computing environment, comprising:
a processor configured to:
receive a notification that variable information, associated with a variable, is to be stored in a data structure associated with one or more logical workspaces,
the variable information being generated by a first application associated with the one or more logical workspaces,
an identifier of the variable being included in the first application, and
the identifier of the variable being included in a second application,
retrieve, from a memory and based on the notification, set up information associated with the variable,
the set up information identifying a manner in which meta information, associated with the variable, is generated,
generate meta information associated with the variable,
the meta information being generated in the manner identified by the set up information, and
the meta information including information associated with a temporal attribute of the variable and further including at least one of:
information identifying a time at which the variable information was generated by the first application,
information associated with a version of the variable,
information associated with the first application,
information associated with a contextual attribute of the variable,
information associated with a visual attribute of the variable,
information associated with the one or more logical workspaces,
information associated with a spatial attribute of the variable,
information associated with a temporal attribute of the first application, or
information associated with a change log of the variable over a period of time, and
associate the meta information with the variable information that is stored in a data structure associated with the one or more logical workspaces,
associating the meta information permitting an operation to be performed on the meta information or the variable information.

10. The computing device of claim 9, further comprising:
the memory,
where the processor is further configured to:
determine that the set up information, associated with the variable, includes a default setting,
where the default setting indicates that the meta information is to include:
the information associated with the temporal attribute of the variable,
the information associated with the first application, and
at least one of:
the information associated with the contextual attribute of the variable, or
the information associated with the visual attribute of the variable.

11. The computing device of claim 9,
where the processor is further configured to:
determine that the set up information, associated with the variable, includes a default setting, and
where the default setting indicates that the information associated with the contextual attribute of the variable is to be automatically generated.

12. The computing device of claim 9,
where the one or more logical workspaces are associated with a user interface, and
where, when associating the meta information with the variable information, the processor is further configured to at least one of:
store the meta information in the data structure, or
present, to a display device associated with the computing device, the meta information for display via the user interface.

13. The computing device of claim 9, where, when associating the meta information with the variable information, the processor is further configured to at least one of:
store the meta information in the data structure associated with the one or more logical workspaces,
present the meta information, for display, via one or more user interfaces associated with the one or more logical workspaces, or
generate the meta information to enable another application, associated with the one or more logical workspaces, to perform the operation on the variable information.

14. The computing device of claim 9, where each of the one or more logical workspaces is associated with the first application or at least one of one or more other applications.

15. The computing device of claim 9,
where the first application is an executable graphical model that generates the variable information in the technical computing environment, and
where at least one of the one or more logical workspaces is associated with the technical computing environment.

16. The computing device of claim 9, where the processor is further configured to:
identify the one or more logical workspaces based on the information associated with the one or more logical workspaces obtained from the set up information associated with the variable.

17. A non-transitory computer-readable medium storing instructions, the instructions comprising:
one or more instructions which, when executed by at least one processor, cause the at least one processor to receive a notification that variable information, associated with a variable, is stored in a data structure associated with a logical workspace,
the variable information being generated by a first application associated with the logical workspace in which the variable is stored,
an identifier of the variable being included in the first application, and
the identifier of the variable being included in a second application;
one or more instructions which, when executed by the at least one processor, cause the at least one processor to retrieve, from a memory, set up information associated with the variable,
the set up information identifying a manner in which meta information, associated with the variable, is generated;

one or more instructions which, when executed by the at least one processor, cause the at least one processor to generate, based on the notification, the meta information associated with the variable,
the meta information being generated in the manner identified by the set up information, and
the meta information including information associated with a temporal attribute of the variable and further including at least one of:
information identifying a time at which the variable information was generated by the first application,
information associated with a version of the variable,
information associated with the first application,
information associated with a contextual attribute of the variable,
information associated with a visual attribute of the variable,
information associated with the logical workspace,
information associated with a spatial attribute of the variable,
information associated with a temporal attribute of the first application,
information associated with a change log of the variable over a period of time; and
one or more instructions which, when executed by the at least one processor, cause the at least one processor to associate the meta information with the variable information stored in the data structure associated with the logical workspace,
the meta information being associated with the variable information to permit an operation to be performed on the meta information or the variable information.

18. The non-transitory computer-readable medium of claim 17,
where the first application includes an executable graphical model, and
where the meta information is associated with the executable graphical model generating, within a technical computing environment, the variable information.

19. The non-transitory computer-readable medium of claim 17, the instructions further comprising:
one or more instructions to create, based on the notification, the data structure associated with the logical workspace in which the variable information is to be stored.

20. The non-transitory computer-readable medium of claim 17,
where the first application includes an executable graphical model, and
where:
the logical workspace is associated with the executable graphical model, or
the logical workspace is associated with one or more other executable graphical models.

21. The non-transitory computer-readable medium of claim 17, where the meta information further includes a plurality of:
the information associated with the first application,
the information associated with the logical workspace,
the information associated with the contextual attribute of the variable, or
the information associated with the visual attribute of the variable.

22. The non-transitory computer-readable medium of claim 17, the instructions further comprising:
one or more instructions to determine that the set up information indicates that the meta information is to include:
the information associated with the temporal attribute of the variable, and
at least one of:
the information associated with the first application,
the information associated with the logical workspace,
the information associated with the contextual attribute of the variable, or
the information associated with the visual attribute of the variable.

23. The non-transitory computer-readable medium of claim 17,
where the logical workspace and the other logical workspace are associated with a distributed logical workspace, and
where the instructions further comprise:
one or more instructions to identify that other meta information, that is stored in the data structure associated with the logical workspace, is not stored in the data structure associated with the other logical workspace; and
one or more instructions to store the other meta information in the data structure associated with the other logical workspace based on identifying that the other meta information is not stored in the data structure associated with the other logical workspace.

24. The non-transitory computer-readable medium of claim 17, where the information associated with the temporal attribute of the variable includes:
a time at which the variable information was stored in the data structure associated with the logical workspace.

25. The computing device of claim 9, where the information, associated with the temporal attribute of the variable, includes a time at which the variable information was stored in the data structure associated with the one or more logical workspaces.

26. The computing device of claim 9, where the first application is same as the second application.

* * * * *

UNITED STATES PATENT AND TRADEMARK OFFICE
CERTIFICATE OF CORRECTION

PATENT NO. : 9,542,164 B1  
APPLICATION NO. : 13/039113  
DATED : January 10, 2017  
INVENTOR(S) : Pieter J. Mosterman It is certified that error appears in the above-identified patent and that said Letters Patent is hereby corrected as shown below:

In the Claims

Column 27, Line 22, Claim 17, change "the first application," to --the first application, or--

Signed and Sealed this  
Twenty-eighth Day of February, 2017

Michelle K. Lee  
*Director of the United States Patent and Trademark Office*